United States Patent
Östberg (10) Patent No.: US 8,458,861 B2
(45) Date of Patent: Jun. 11, 2013

(54) COUPLING DEVICE FOR COUPLING CONTAINERS, PARTICULARLY CONTAINERS USED IN CARGO SHIPS

(75) Inventor: Juhana Östberg, Turku (FI)

(73) Assignee: Cargotec Finland Oy, Kaarina (FI)

( * ) Notice: Subject to any disclaimer, the term of this patent is extended or adjusted under 35 U.S.C. 154(b) by 178 days.

(21) Appl. No.: 13/119,088

(22) PCT Filed: Feb. 2, 2009

(86) PCT No.: PCT/FI2009/050086
§ 371 (c)(1),
(2), (4) Date: Apr. 25, 2011

(87) PCT Pub. No.: WO2010/031897
PCT Pub. Date: Mar. 25, 2010

(65) Prior Publication Data
US 2011/0197401 A1     Aug. 18, 2011

(30) Foreign Application Priority Data
Sep. 16, 2008  (FI) ..................... 20085866

(51) Int. Cl.
*B60P 7/13* (2006.01)
*B65D 90/00* (2006.01)
*B63B 25/00* (2006.01)

(52) U.S. Cl.
USPC ............................................. 24/287; 410/77

(58) Field of Classification Search
USPC ................... 24/287, 288; 410/69–76, 79, 82, 410/83, 77; 446/124; 403/325; 292/95, 109; 220/1.5, 23.4, 23.6
See application file for complete search history.

(56) References Cited

U.S. PATENT DOCUMENTS

| | | | | | |
|---|---|---|---|---|---|
| 4,277,212 | A | * | 7/1981 | Rosaia | 410/78 |
| 5,106,247 | A | * | 4/1992 | Hove et al. | 410/73 |
| 5,454,673 | A | * | 10/1995 | DiMartino | 410/79 |
| 5,570,981 | A | * | 11/1996 | Brewster | 410/70 |
| 5,613,814 | A | * | 3/1997 | Jackson | 410/70 |
| 6,460,227 | B2 | * | 10/2002 | Hove | 24/287 |
| 6,974,164 | B2 | * | 12/2005 | Brewster | 292/109 |
| 7,114,898 | B2 | * | 10/2006 | Brewster | 410/70 |
| 7,637,704 | B2 | * | 12/2009 | Morin | 410/69 |
| 7,896,593 | B2 | * | 3/2011 | Brewster | 410/70 |

FOREIGN PATENT DOCUMENTS
WO  WO 2005/054086 A1  6/2005

\* cited by examiner

*Primary Examiner* — Robert J Sandy
*Assistant Examiner* — Abigial E Morrell
(74) *Attorney, Agent, or Firm* — Birch, Stewart, Kolasch & Birch, LLP (57) ABSTRACT

A coupling device for coupling containers includes a body part having a fastening piece and a cam part on upper and lower parts thereof, and a planar coupling plate between the upper and lower parts. The fastening piece is fastenable to an upper corner piece in a corner of a container by rotating the body part around its vertical axis. The cam part controls the motion of the body part and receives substantially vertical forces between the containers. The body part includes a first rotating locking part for preventing and/or releasing the motion of the body part, and a second rotating locking part for enabling and/or preventing lateral motion of the body part. The second locking part is in direct or indirect contact with the first locking part so that when the first locking part rotates, the second locking part also rotates, enabling a locking mode or an unlocking mode.

11 Claims, 6 Drawing Sheets

COUPLING DEVICE FOR COUPLING CONTAINERS, PARTICULARLY CONTAINERS USED IN CARGO SHIPS

BACKGROUND OF INVENTION

The invention relates to a coupling device according to the preamble of claim 1, which is used for coupling containers to each other, and particularly for coupling containers used in cargo ships to each other. In addition to sea transport, containers are also used for land transport.

Conventionally when aboard ships, stacks formed by containers are able to tilt sideways, depending on the degree of the list of the ship. This means that at least two corners i.e. those of one or the other side of the container are under pressure caused by the mass of containers above them.

On the other hand, when lifting containers, they are lifted so that all four corners are lifted up at the same time. For this reason, it is possible to distinguish clearly when the coupling devices of the containers have to be brought to a locking mode or an unlocking mode. In known arrangements, a vertical force, i.e. lifting force, is converted in the coupling device into a lateral (horizontal) force which compels the container being lifted, the upper and the lower one, to move sideways in relation to each other.

PRIOR ART

Different arrangements are known from prior art for coupling containers to each other. Such arrangements are known in which containers are coupled to each other by coupling devices which operate totally manually i.e., when using them, the coupling occurs in both the locking stage and the unlocking stage totally by hand. Also semi-automatic and fully-automatic coupling arrangements are known. This now described coupling device relates to such a coupling device which operates fully-automatically.

From specification EP1810938 is known a coupling arrangement for coupling containers, which arrangement describes a fully-automatic coupling piece, in which coupling piece, there is a cam-like part for receiving the weight of the container being lifted and one rotatable locking piece for enabling a locking mode and an unlocking mode. The locking piece is arranged movable on the opposite side of the cam-like part.

A fully-automatically operating coupling arrangement is described in specification WO2006/137759 A1. The coupling device according to the specification depicts an arrangement for coupling containers to each other, in which coupling device, there is a body in which is connected a locking part which operates by rotating around a vertical shaft for locking and unlocking. In the locking part, there are also asymmetrical guide surfaces by means of which the locking mode and the unlocking mode are provided.

Arrangements according to prior art include some disadvantages. The arrangements according to known prior art operate asymmetrically i.e., in other words, only the couplings (lockings) of one side operate in lower containers. Because of this, their operation can be unreliable and even cause dangerous situations, because the locking of the coupling devices can fail due to forces caused by asymmetric lockings. This is possible particularly when there are unwanted deviations from set dimensional tolerances in the containers. Already with safe loads, the lockings cause permanent changes in the corner pieces of the containers due to one-sided load distribution, and this is extremely disadvantageous.

The coupling arrangements are part of a larger entity which includes also other parts (such as locking bars etc.), and these parts have to receive great loads which are produced when the containers are coupled in the ship and when the ship moves, and the parts have to be able to lock the containers fast in each other and in the ship. If displacements in the coupling arrangements, i.e. the displacement of coupling arrangements when they are being fitted in the corner pieces of the containers, grow too great, then there is a risk that other than the coupling pieces, such as locking bars etc., receive too great forces and the system will overload.

The object of this invention is thus to provide a novel kind of a coupling device for coupling containers to each other, by which coupling arrangement, it is possible to eliminate or minimise the disadvantages of known arrangements and to achieve a well and reliably operating coupling device arrangement.

BRIEF DESCRIPTION OF INVENTION

By means of this now described invention, a novel kind of a coupling device is provided for coupling containers to each other, by which problems of known arrangements can be eliminated, and by which is indeed achieved a coupling device which is easy to use and reliable in use. By the coupling device, it is possible to couple the containers to each other such that they cannot unlock from each other unintentionally and that it operates effectively for receiving substantially vertical forces between the containers (and further forces in other directions) and, the containers being coupled, the coupling device well endures stresses directed to it. Furthermore, the arrangement according to the invention is relatively simple and inexpensive to manufacture.

BRIEF DESCRIPTION OF FIGURES

The invention will next be described in more detail by means of examples with reference to drawings 1-5 in which.

DETAILED DESCRIPTION OF INVENTION

Figure 1A:
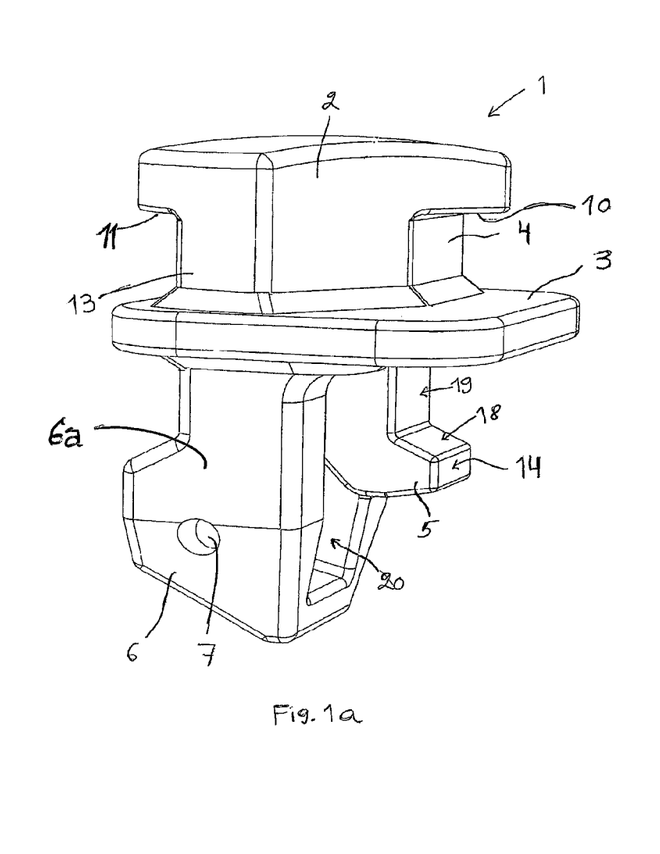
FIGS. 1a and 1b show a coupling device according to the invention.
Figure 1B:
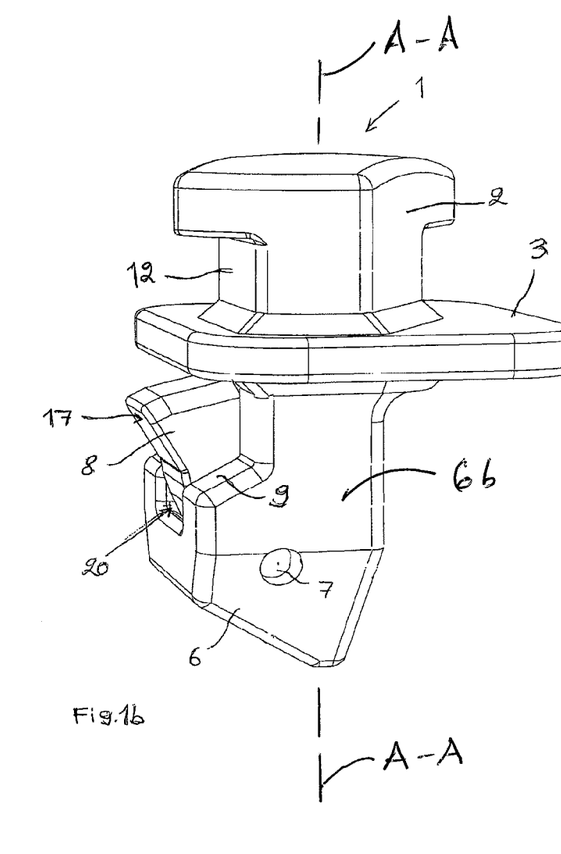

In accordance with FIGS. 1a and 1b, in a coupling device 1 according to the invention, there is in its body part 13 a fastening piece 2 formed in the upper part of the body part 13, by which the body part 13 is fastenable in a corner piece 26 in the corner of a container 40 (see FIGS. 2a, 4) by rotating the body part 2 around a vertical axis A-A thereof, whereby the fastening piece 2 fastens in the corner piece of the container 40, such that horizontal surfaces 10, 11 in the body part 13 receive vertical forces, and vertical surfaces 4, 12 in the body part 13 receive horizontal forces.

In the body part is formed between its upper part and lower part a planar coupling plate 3, which coupling plate sets between containers 40, 41 being lifted (FIG. 4), receiving forces between the containers, mostly the weight of the upper container 40, further the coupling plate receives and transfers friction forces which are produced of the weight of the containers when the containers 40, 41 set on top of each other try to move horizontally in relation to each other.

In the body part 13, there is a cam part 6 for controlling the motion of the body part 13 and for receiving vertical forces, and in the body part 13 is fitted a first rotating lever-like locking part 8 for preventing and/or releasing the motion of the body part 13.

In the body part 13, there is also a second rotating lever-like locking part 5 for enabling and/or preventing the lateral motion of the body part 13 and for receiving vertical forces, and the second locking part 5 is directly or indirectly in contact with the first lever-like locking part 8, so that when the first lever-like locking part 8 rotates, the second lever-like locking part 5 is also able to rotate for enabling the locking mode and the unlocking mode (shown in FIGS. 2a-2d). In the second lever-like locking part 5 is fitted a spring-like piece (not shown in the figure when being fitted within the body part) which is fitted to push (or pull) the second locking part 5 within the body part 13, into a slot 20 in the body part 13. The spring-like piece can also be connected to the first locking part 8. The second locking part 5 thus presses the first locking part 8 outwards of the body part 13, it being directly or indirectly in contact with the first locking part 8. When the first locking part 8 is not loaded in any way, it is in the position shown by FIG. 1b i.e., there are surfaces which protrude from the cam part 6. The first locking part 8 is pressable and rotatable within slot 20 of the cam part 6 partially or totally, and then it is loaded by pressing a surface 17, whereby it rotates around a shaft 7 (having axis A1). Shaft 7 is supported by vertical sides 6a, 6b of the cam part 6 on opposite sides of the first locking part 8 and the first locking part 8 moves rotationally within slot 20 within the cam part 6. In addition, the fastening piece 2 has multiple vertical sides 4, 12 which are not parallel to vertical sides 6a, 6b of the cam part 6.

Figure 2A:
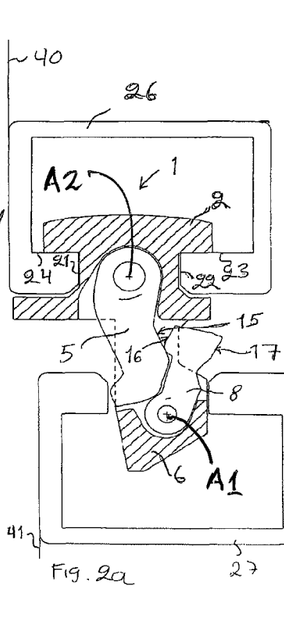
FIGS. 2a-2d show the coupling of two containers to each other by the coupling device according to the invention.

FIGS. 2a-2d show the coupling of two containers 40, 41 to each other by a coupling device 1 according to the invention, in which situation of FIG. 2a, the coupling device is fastened in the corner piece 26 of the upper container 40 by means of the fastening piece 2 in the body part so that that the horizontal and vertical surfaces 4, 10, 11 and 12 of the fastening piece 2 are in contact with mating surfaces 21, 22, 23 and 24 of the corner piece, keeping the coupling device in place in the corner piece, whereby the coupling device cannot move in the corner piece in the horizontal or vertical direction. In accordance with the figure, a lower corner piece 27 stays in place and the upper corner piece 26 moves downwards, in which upper corner piece the coupling device 1 is fastened. In the situation shown by FIG. 2a, no lateral motion between the upper and lower corner piece yet exists, because the cam part 6 or either of the lever-like locking parts 5, 8 are not in contact with the lower corner piece 27.

Figure 2B:
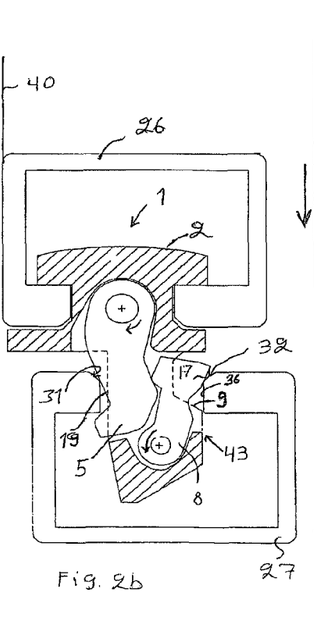

In the situation shown by FIG. 2b, when the upper container where the coupling device is fastened has been lowered downwards, a contact is created between surfaces 31, 32 of the lower corner piece 27 and surfaces 17, 19 of the first locking part 8 and the second locking part 5. Then no lateral motion yet occurs, because a vertical surface 43 of the cam part 6 is able to contact a vertical surface 36 of the corner piece, preventing moving sideways.

Figure 2C:
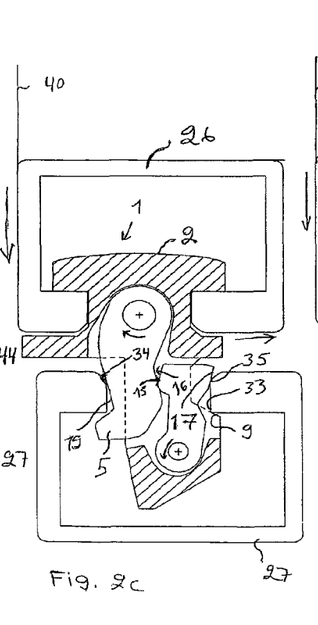

As shown in FIG. 2c, when the upper container 40 is further lowered, a contact is created between an inclined surface 9 of the cam part 6 and a surface 33 of the corner of the corner piece 27, and further also the second locking part 5 is in contact with the corner piece 27 so that a contact occurs as a surface 34 of the corner of the lower corner piece 27 contacts a surface 18 of the second locking part 5. The first locking part 8 equivalently contacts a surface 35 of the second (opposite) corner of the corner piece 27. Furthermore, the first locking part 8 "presses" the second locking part 5 (is coupled to it), because surfaces 15, 16 of the first and the second locking part 8, 5 are in contact with each other. Additionally, when lowering the upper corner piece 26, the first locking part 8 rotates around shaft 7 (having axis A1) which is mounted on the cam part 6, so that it rotates counter clockwise, and equivalently, the second locking part 5 rotates clockwise around shaft 25 (having axis A2) which is mounted on the fastening piece 2. Then, the upper corner piece 26 is able to move to the right. The inclined surface 9 of the cam part 6 is in contact with the surface 33 of the corner of the corner piece 27, and the inclined surface 9 controls the motion.

Figure 2D:
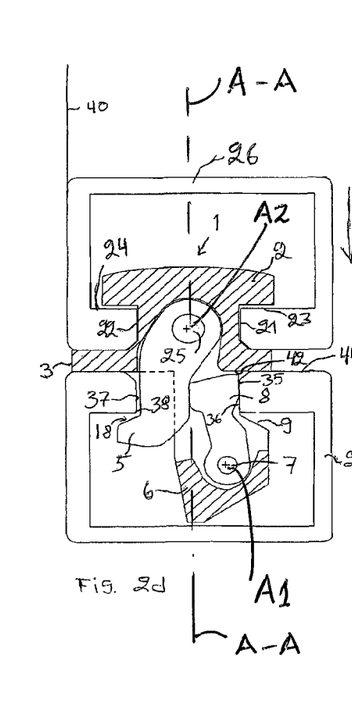

In accordance with FIG. 2d, when the upper container is lowered so much that the upper container rests on top of the lower container, and its weight presses the lower container via the coupling plate 3 and friction forces are caused between them, because lower surfaces 42 of the coupling plate 3 contact a surface 44 of the corner piece 27 of the lower container.

In accordance with the figure, the corner pieces 26, 27 are then in incidence. Then, the first and the second locking part are rotated such in their extreme positions that the first locking part 8 is within the body part and contacts with the surface 17 only to the (vertical) surface 36 of the corner piece, and the second locking part is, again, equivalently rotated so that it is in contact with its inclined surface 18 and the surface 19 to the surface 37 of the corner piece. As the horizontal motion of the container is now prevented by means of the first and the second locking part, then also the vertical motion of the upper container is prevented, because the surface 18 of the second locking part contacts the surface 33 of the corner of the corner piece and the surface 9 of the cam part contacts the surface 36 of the corner of the corner piece, due to which the coupling device 1 cannot rise upwards, because as the above-mentioned surfaces contact each other the motion upwards is prevented.

FIGS. 3a-3d show the unlocking of the coupling between two containers when the upper container is lifted with a lifter or some other lifting device.

Figure 3A:
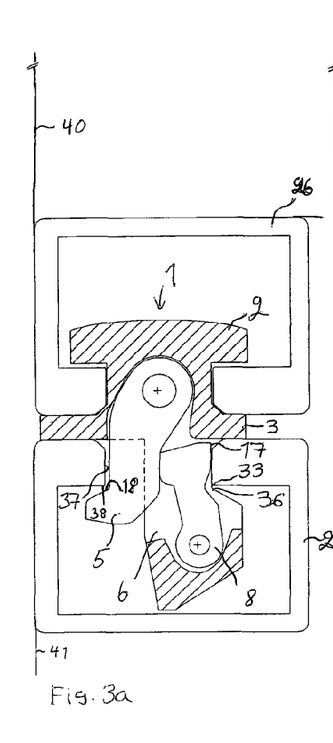
FIGS. 3a-3d show the unlocking of the coupling between two containers.

In accordance with FIG. 3a, as the upper container 40 is on top of the lower container 41, its weight causes friction force between the containers so that the coupling plate 3 presses the lower corner piece 27 and, thus, friction force is created between them. The friction prevents the motion of the containers 40, 41 in relation to each other.

When the containers are coupled to each other, the vertical motion between them is prevented by the coupling device 1 so that the surface 36 of the corner of the cam part is in contact with the surface 33 of the corner of the corner piece and equivalently the surface 18 of the second locking part is in contact with the surface 38 of the corner of the corner piece. In accordance with the figure, the second locking part is shaped such that there is a corner point in the surface 18 and just from the corner point 38 the second locking part 5 is in contact with the surface 38 of the corner of the corner piece 27 preventing the vertical motion.

Figure 3B:
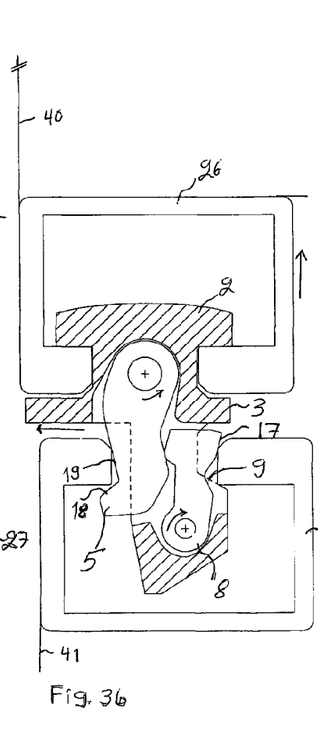

In accordance with FIG. 3b, when the lifting of the upper container is started, the friction force prevailing between the containers exits, and a horizontal motion caused by the coupling device 1 (coupling devices) between the containers is created, and the inclined surface 9 of the cam part controls the horizontal motion.

The first and the second locking part 5, 8 are then able to rotate controllably (freely) they being in contact with the surfaces of the corner piece 27.

Figure 3C:
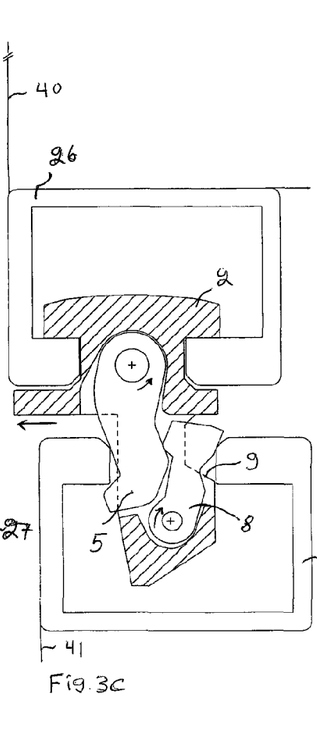

In accordance with FIG. 3c, when the upper container is further lifted, also the horizontal motion still continues until the inclined surface 9 of the cam part no longer contacts the corner piece 27.

Figure 3D:
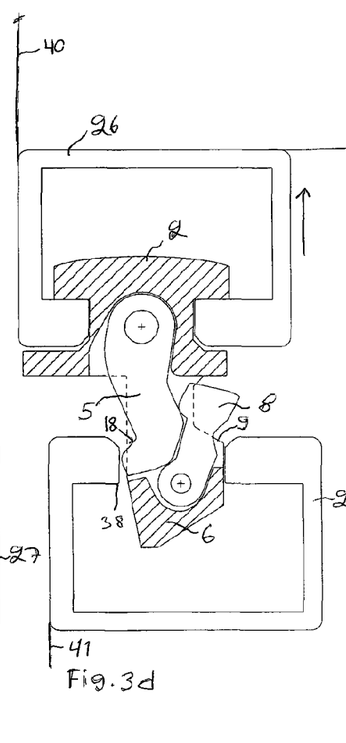

In accordance with FIG. 3d, the coupling device 1 can be lifted up from the lower corner piece 27, when the second locking part 5 and the cam part 6 do not prevent the vertical motion. Then, the second locking part 5 is totally or almost totally rotated within, into the slot 20 shown in FIG. 1.

Figure 4:
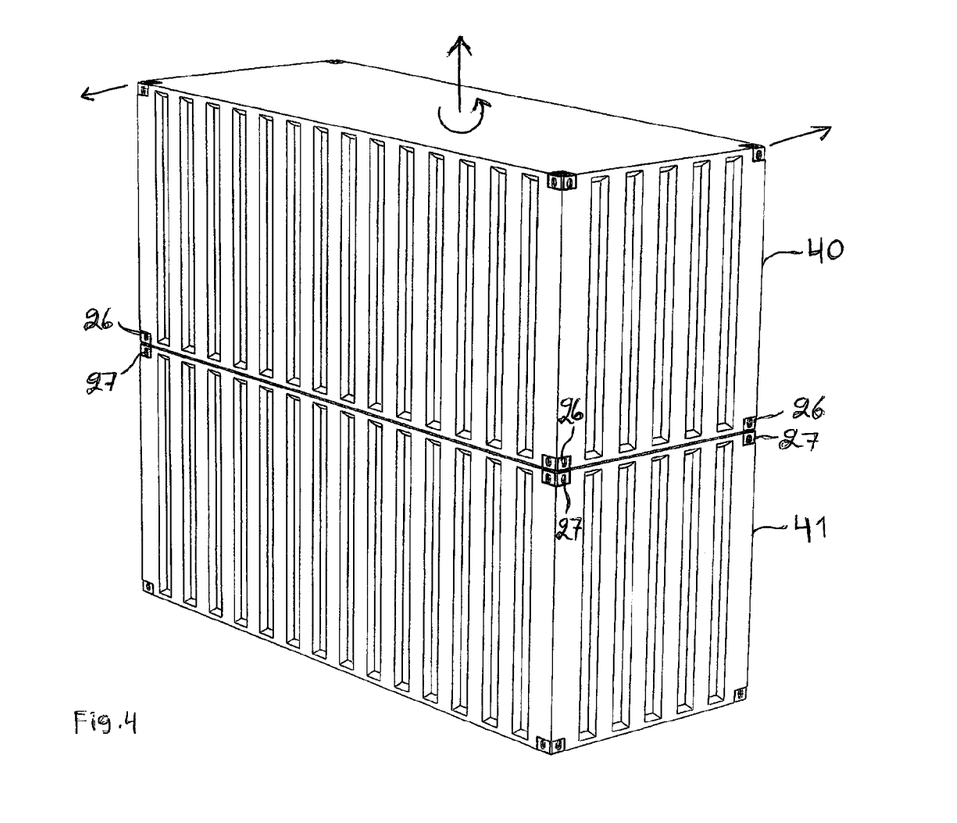
FIG. 4 shows a situation in which two containers are coupled to each other and a rotational motion between them i.e. the rotation of one container around a vertical shaft in a lifting situation.

FIG. 4 shows a situation in which two containers 40, 41 are coupled to each other, whereby the corners (corner pieces 26, 27) of the containers are in incidence. The upper container 40 is fastened from each corner by means of the coupling device (not shown in FIG. 4) to the lower container 41 from the corner pieces in the containers. The figure shows a rotational direction i.e. the direction in which the upper container is able to rotate when the lifting of the upper container is started. Then, when lifting the upper container, friction forces between the containers, which are caused by the weight of the upper container it being on top of the lower container, exit, and further the coupling devices are able to unlock as shown in FIGS. 3a-3b, at the same time a small rotational motion, i.e. a motion occurring around the vertical shaft of the containers, is created between the containers. The coupling devices set at one end of the container are, in a situation in which the lifting of the upper container is started, able to move in the opposite direction than the ones set at the other end, and precisely this enables the operation of the coupling device.

Figure 5:
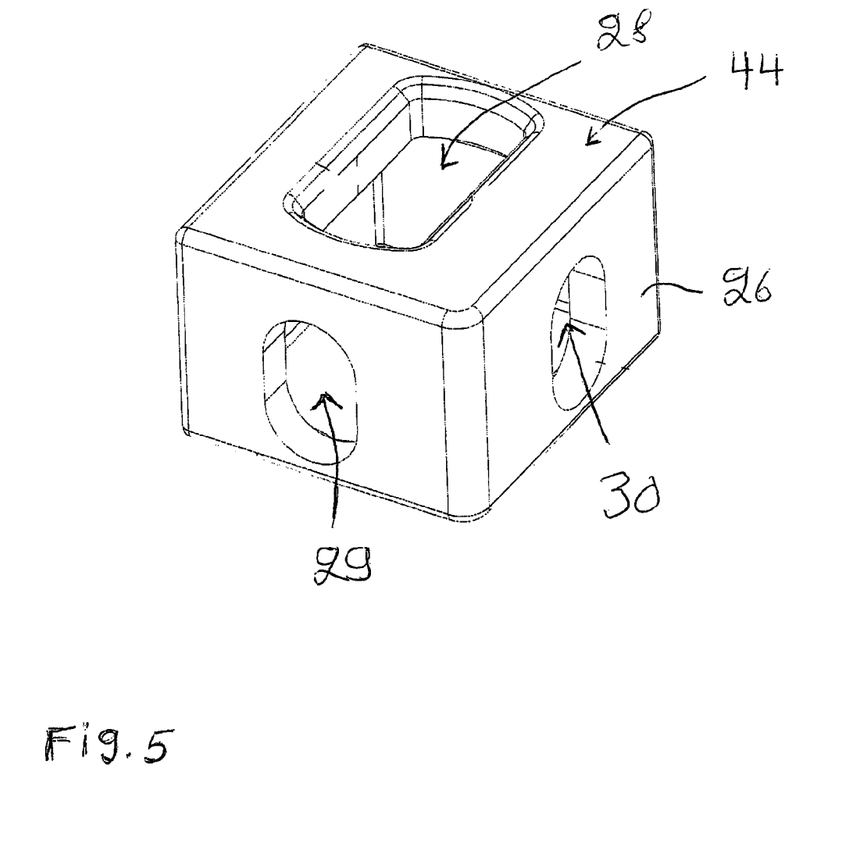
FIG. 5 shows a corner piece in the corners of the container.

FIG. 5 shows a corner piece in the corners of the container. In accordance with the figure, the corner piece is a rectangular piece and, in it, on its above surface 44 is formed a coupling opening 28. On the sides of the corner piece, there are further openings 29, 30 for lifting with a lifting hook or some other and for fastening support means etc.

Figure 6:
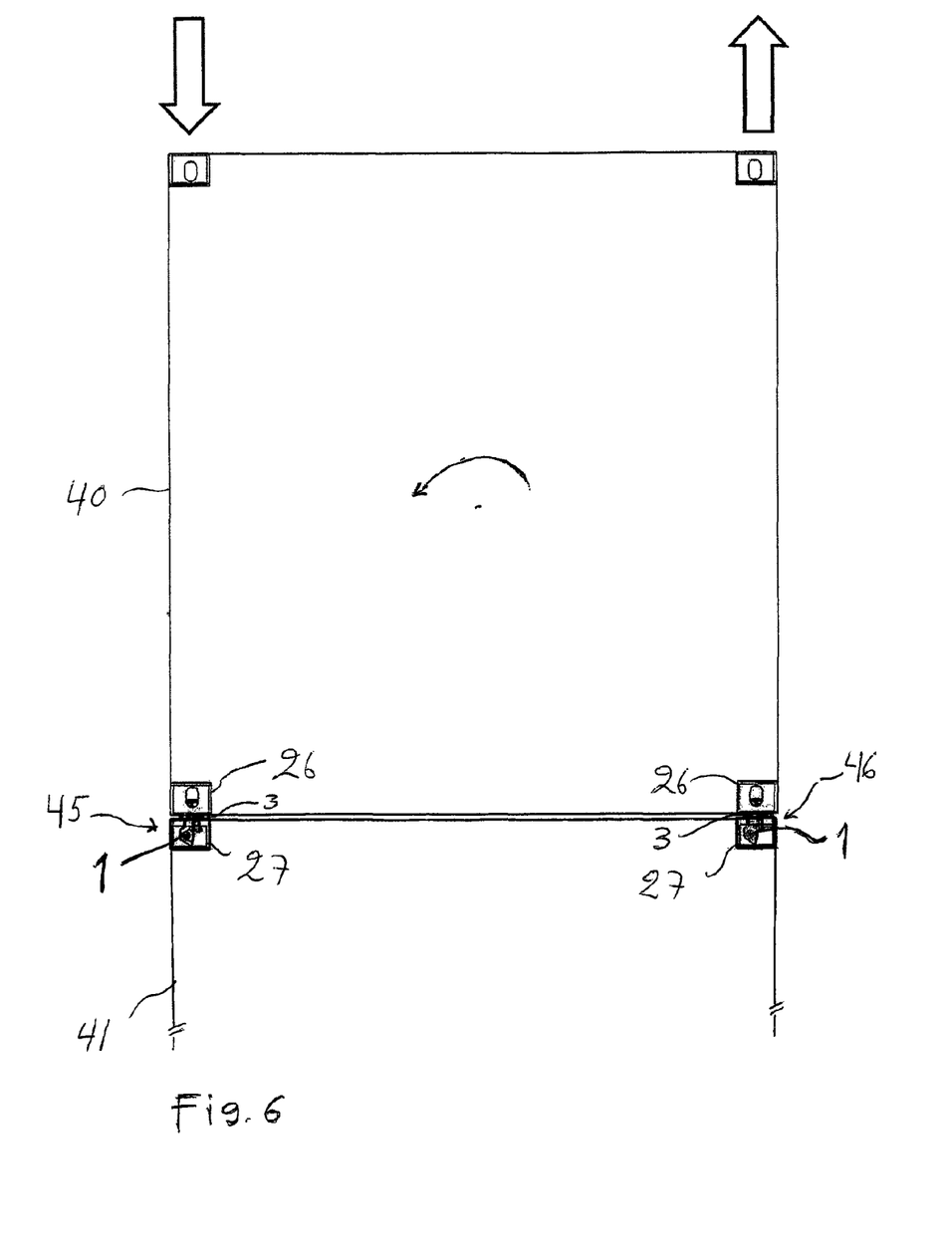
FIG. 6 shows vertical forces which occur in the coupling of the container.

In accordance with FIG. 6, when the containers are coupled to each other in the corner pieces 26, 27 by the coupling device 1, the containers coupled to each other tilting on the left, pressing (shown with an arrow) is created in a left corner 45 of the lower container which is caused by the weight of the upper container 40, and this pressing force further presses the left side of the lower container 41, its corner 45. Equivalently, in a corner 46 on the right side is created a pulling force which tries to pull the corner 46 separate from the equivalent corner of the lower container. The coupling device 1 fitted in the right corner of the containers thus fall under tensile stress when the containers coupled to each other tilt to the left.

Between the containers, also horizontal forces are created when the containers tilt as the upper container 40 tries to move (slide) to the left, it being on top of the lower container 41. When in the locking mode, the coupling devices fitted in the corner pieces prevent the horizontal motion between the containers, as e.g. FIG. 2a shows.

It is well known by those skilled in the art that the different embodiments of the invention are not solely limited to the examples described above, and thus they may vary within the scope of the appended claims.

The invention claimed is:

1. A coupling device for coupling an upper container to a lower container, comprising:
    a body part having
        an upper part which includes a fastening piece;
        a lower part which includes a cam part; and
        a planar coupling plate between the upper and lower parts,
    wherein the fastening piece is fastenable in a corner piece of the upper container by rotating the body part around a vertical axis (A-A) thereof, and
    the cam part is adapted to control a vertical motion of the body part and to receive substantially vertical forces between the upper and lower containers,
    a first rotating locking part rotatably mounted on the cam part, the first rotating locking part being adapted to prevent and release a vertical motion of the body part, and
    a second rotating locking part rotatably mounted on the fastening piece, the second rotating locking part being adapted to enable and prevent a lateral motion of the body part and to receive the substantially vertical forces between the upper and lower containers,
    wherein the second rotating locking part is capable of making direct contact with the first rotating locking part so that, when the first rotating locking part rotates, the second rotating locking part is also able to rotate, thereby enabling a locking mode and an unlocking mode.

2. The coupling device according to claim 1, wherein the cam part has a first inclined surface on a side facing away from the second rotating locking part,
    the second rotating locking part has a first inclined surface on a side facing away from the cam part, and
    when the first inclined surface of the cam part is in contact with a first inner corner of a lower corner piece of the lower container, and the first inclined surface of the second rotating locking part is in contact with a second inner corner of the lower corner piece of the lower container, a vertical motion between the upper and lower containers is preventable.

3. The coupling device according to claim 1, wherein the first rotating locking part is rotatably mounted on the cam part of the body part by a first shaft, and
    the second rotating locking part is rotatably mounted on the fastening piece of the body part by a second shaft.

4. The coupling device according to claim 1, wherein the first rotating locking part has at least one surface facing the second rotating locking part, and
    the second rotating locking part has at least one surface facing the first rotating locking part, and
    when the at least one surface of the first rotating locking part is in contact with the at least one surface of the second rotating locking part, the first and second rotating locking parts are able to rotate concurrently.

5. The coupling device according to claim 1, wherein each of the first and/or the second rotating locking parts is partially rotatable within a slot of the cam part of the body part.

6. The coupling device according to claim 1, wherein the second rotating locking part, which is rotatably mounted on the upper part of the body part, has a lower portion which abuts an upper portion of the first rotating locking part inside a slot of the lower part of the body part.

7. The coupling device according to claim 1, wherein the first rotating locking part has a surface on a side facing away from the second rotating locking part which contacts a first outer corner of a lower corner piece of the lower container in the locking and unlocking mode, and
    the second rotating locking part has multiple surfaces on a side facing away from the first rotating locking part each of which contacts a second outer corner of a lower corner piece of the lower container in the locking and unlocking mode.

8. The coupling device according to claim 1, wherein the fastening piece has multiple vertical sides which are not parallel to vertical sides of the cam part.

9. The coupling device according to claim 1, further comprising:
- a first shaft for rotatably mounting the first rotating locking part onto the cam part, and
- a second shaft for rotatably mounting the second rotating locking part onto the fastening piece,
- wherein the first shaft has an axis (A1) which extends parallel to an axis (A2) of the second shaft, thereby enabling the first and second rotating locking parts to rotate on a common plane which is perpendicular to upper and lower surfaces of the planar coupling plate.

10. The coupling device according to claim 9, wherein the fastening piece has multiple vertical sides which are not parallel to either of the first and second shafts.

11. The coupling device according to claim 9, wherein the axes (A1, A2) of the first and second shafts are perpendicular to the vertical axis (A-A) of the body part.

* * * * *